Jan. 13, 1925.
P. M. SCHIBROWSKI
HUB CAP
Filed March 5, 1924
1,522,548
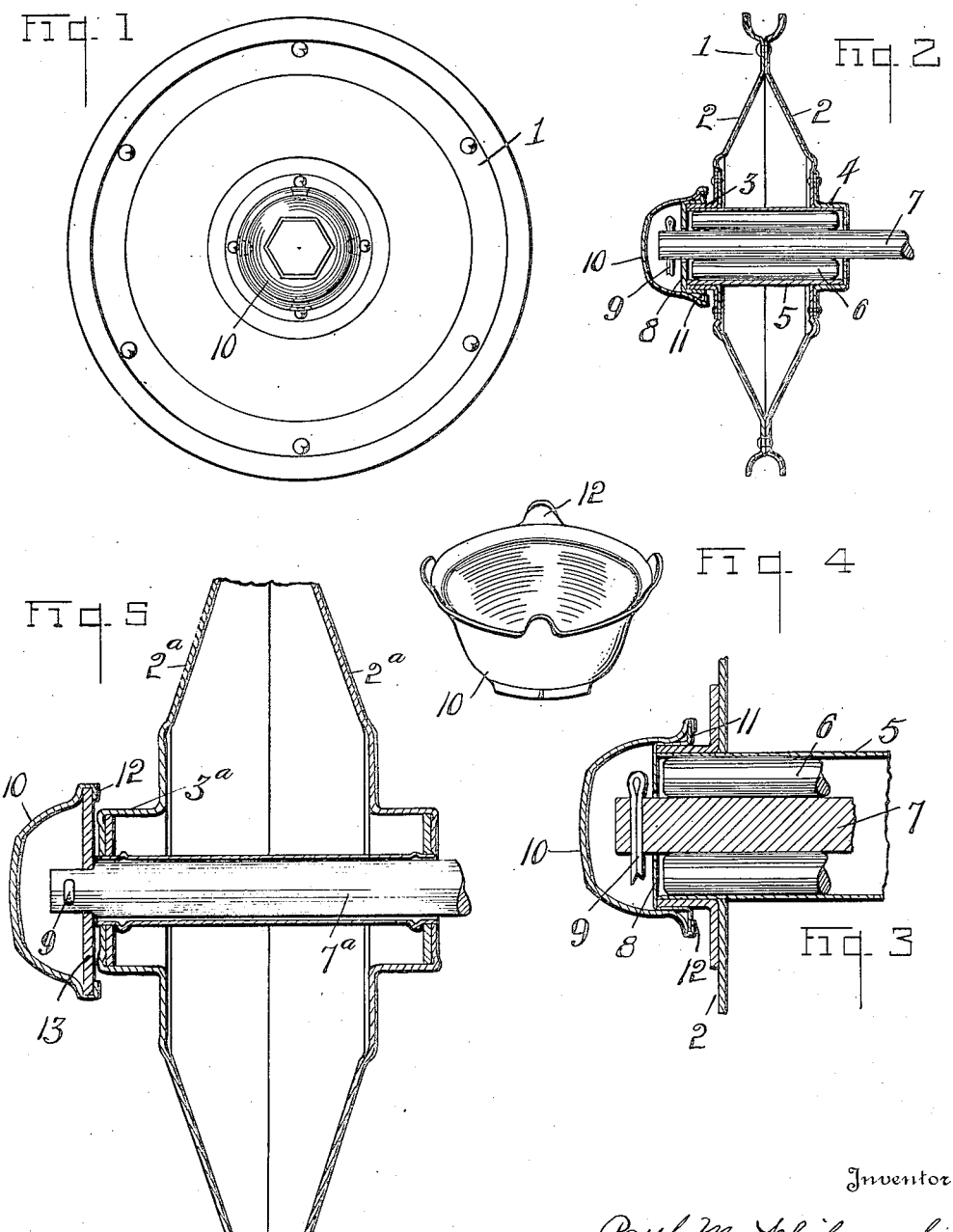

Patented Jan. 13, 1925.

1,522,548

UNITED STATES PATENT OFFICE.

PAUL M. SCHIBROWSKI, OF TOLEDO, OHIO, ASSIGNOR TO THE AMERICAN-NATIONAL COMPANY, OF TOLEDO, OHIO, A CORPORATION OF OHIO.

HUB CAP.

Application filed March 5, 1924. Serial No. 696,970.

*To all whom it may concern:*

Be it known that I, PAUL M. SCHIBROWSKI, a citizen of the United States, and a resident of Toledo, in the county of Lucas and State of Ohio, have invented a new and useful Hub Cap, which invention is fully set forth in the following specification.

In juvenile vehicles it is common to secure the wheels on the axles by cotter pins inserted through holes in the outer ends of the axles. These pins, if not housed, are objectionable, as they catch and tear the clothes of children. It is, therefore, customary, particularly with wire wheels, to enclose the outer axle ends and cotter pins by cap members, which fit over the outer hub ends and are held in position thereon by ears on the caps being bent over the spoke securing flanges of the wheels between the spokes. With metal wheels of the disc type, however, there is no retaining means for the caps over which the ears thereof may be bent, and it is the object of this invention to provide simple and efficient means, in connection with such wheels, with which the protecting caps may be engaged to retain them in position over the axle ends.

The invention is fully described in the following specification, and two embodiments thereof are illustrated in the accompanying drawings, in which,—

Figure 1 is a side elevation of a disc wheel with the protecting cap in engagement therewith. Figure 2 is a central section thereof. Figure 3 is an enlarged fragmentary sectional view similar to Fig. 2. Figure 4 is a perspective view of the protecting cap employed, and Fig. 5 is a fragmentary sectional view of a wheel and its axle equipped with a slightly modified form of the invention.

Referring to the drawings, 1 designates a disc wheel having the opposed side disc portions 2, the outer one of which is provided with an outer hub end portion 3 of cylindrical form and which, in Fig. 2, cooperates with a similar inner hub end portion 4 to retain a bearing sleeve 5 in which an annular set of roller bearings 6 is mounted. The axle 7 for the wheel projects through the set of bearings 6 and through the center of a hub cap 8 that is mounted on the outer hub end 3 of the wheel. This cap telescopingly fits over the hub end 3 and has its free edge outwardly flanged in spaced relation to the wheel side. A cotter pin 9 projects transversely through the axle at the outer side of the hub cap 8 to retain the wheel on the axle.

A protecting cap 10 is mounted over the hub cap 8 in telescoping relation thereto and in protecting relation to the outer end of the axle 7 and cotter pin 9. In order to secure this cap on the hub cap, the latter has its free edge terminating short of the adjacent wheel side and turned outwardly to form an annular, radially projecting flange 11, and the cap 10 has ears 12 at its free edge for bending inwardly over the flange 11 at the inner side thereof.

If the wheel should be of the type which does not employ a hub cap 8, as shown in Fig. 5 wherein 2ª designates the side disc portions of the wheel and 3ª the outer hub end portion of the outer disc, or if it is not desired to use such a cap, a collar 13 may be mounted on the axle 7ª between the cotter pin and hub end and the protecting cap 10 may have its ears 12 engaged over the outer peripheral edge of this collar, as shown in Fig. 5.

It is evident that I have provided a simple and efficient means in connection with disc wheels and the carrying axles of juvenile vehicles for retaining a cap member in protecting relation to the associated axle end to prevent children tearing their clothes by engagement of the same with either the axle end or the cotter pin employed in the same.

I wish it understood that my invention is not limited to any specific arrangement, construction or form of the parts as it is capable of numerous modifications and changes without departing from the spirit of my claims.

Having thus described my invention, what I claim as new and desire to secure by Letters Patent is:—

1. In a juvenile vehicle, an axle, a disc wheel mounted thereon and having a cylindrical outer hub end, a hub cap disposed at the inner side of the pin and mounted over the hub end with the free edge of its hub engaging portion outwardly flanged in spaced relation to the wheel side, and a protecting cap mounted over the axle end and pin in telescoping relation to the hub cap and having bendable ears engageable over the hub cap flange.

2. In a juvenile vehicle, an axle, a wheel mounted on the axle and having a projecting hub end means on the axle end for retaining the wheel thereon, a hub cap disposed at the inner side of said means and mounted over the hub end and having an integral radially projecting outer edge portion which is spaced from the wheel side, and a protecting cap mounted over the axle end and securing means, one of said caps having integral bendable ears in holding engagement with the edge portion of the other.

In testimony whereof, I have hereunto signed my name to this specification.

PAUL M. SCHIBROWSKI.